(12) United States Patent
O'Neill et al.

(10) Patent No.: US 12,165,182 B2
(45) Date of Patent: Dec. 10, 2024

(54) AUTOMATIC INVOICE CREATION FOR CHAT AND SOCIAL PLATFORMS

(71) Applicant: PayPal, Inc., San Jose, CA (US)

(72) Inventors: Megan Marie O'Neill, San Jose, CA (US); Gregory Crescimanno, Shanghai (CN); Dereck Quock, Fremont, CA (US); Sumit Savla, Milpitas, CA (US); Shilpa Dhar, Los Altos, CA (US); Bill Scott, Morgan Hill, CA (US)

(73) Assignee: PAYPAL, INC., San Jose, CA (US)

( * ) Notice: Subject to any disclaimer, the term of this patent is extended or adjusted under 35 U.S.C. 154(b) by 70 days.

(21) Appl. No.: 17/515,445

(22) Filed: Oct. 30, 2021

(65) Prior Publication Data
US 2022/0108365 A1    Apr. 7, 2022

Related U.S. Application Data

(63) Continuation of application No. 15/850,747, filed on Dec. 21, 2017, now abandoned.
(Continued)

(51) Int. Cl.
*G06Q 30/04* (2012.01)
*G06Q 20/04* (2012.01)
(Continued)

(52) U.S. Cl.
CPC .......... *G06Q 30/04* (2013.01); *G06Q 20/047* (2020.05); *G06Q 20/102* (2013.01);
(Continued)

(58) Field of Classification Search
CPC .... G06Q 30/04; G06Q 20/047; G06Q 20/102; G06Q 20/401; H04L 12/1813; H04L 51/04; H04L 51/52
See application file for complete search history.

(56) References Cited

U.S. PATENT DOCUMENTS

| 9,767,520 B2 | 9/2017 | Isaacson et al. |
| 2005/0210396 A1* | 9/2005 | Galli ........................ G06F 8/00 715/758 |
| 2010/0031330 A1 | 2/2010 | Von Ahn et al. |
| 2011/0153467 A1 | 6/2011 | Salmen et al. |

(Continued)

OTHER PUBLICATIONS

Osborne, Virtual Shop Assistant Chatbot with Amazing Image Recognition, Feb. 9, 2017, https://www.robinosborne.co.uk/2017/02/09/virtual-shop-assistant-chatbot-with-amazing-image-recognition/ (Year: 2017).*

*Primary Examiner* — Allen C Chein
*Assistant Examiner* — Aaron N Tutor
(74) *Attorney, Agent, or Firm* — HAYNES AND BOONE, LLP

(57) ABSTRACT

A method includes determining that a chat text provided in a chat session between first and second chat application instances is directed to a transaction negotiation, the chat session for facilitating communication between the chat application instances. The method includes determining, in an image associated with the transaction, first and second image elements that are associated with the transaction. Responsive to the determination that the chat text is directed to the negotiation of the transaction, the method can generate an invoice for a first transaction portion that is associated with the first element. The method can provide the invoice, via the chat session, to the first and/or chat application instance. Responsive to determining that the first transaction portion is performed, the method can determines to indicate, via the image, that the first element is unavailable for additional transactions.

20 Claims, 12 Drawing Sheets

Related U.S. Application Data

(60) Provisional application No. 62/566,258, filed on Sep. 29, 2017.

(51) Int. Cl.
*G06Q 20/10* (2012.01)
*G06Q 20/40* (2012.01)
*H04L 12/18* (2006.01)
*H04L 51/04* (2022.01)
*H04L 51/52* (2022.01)

(52) U.S. Cl.
CPC ....... *G06Q 20/401* (2013.01); *H04L 12/1813* (2013.01); *H04L 51/04* (2013.01); *H04L 51/52* (2022.05)

(56) References Cited

U.S. PATENT DOCUMENTS

| | | |
|---|---|---|
| 2013/0145441 A1 | 6/2013 | Mujumdar et al. |
| 2015/0073907 A1 | 3/2015 | Purves et al. |
| 2015/0142661 A1* | 5/2015 | Jain ................... G06Q 20/102 705/35 |
| 2015/0187056 A1 | 7/2015 | Nakamae et al. |
| 2015/0348155 A1 | 12/2015 | DuBois |
| 2016/0300294 A1* | 10/2016 | Roche .................... H04L 51/52 |
| 2016/0307249 A1* | 10/2016 | Ku ...................... G06Q 30/0613 |
| 2017/0249491 A1 | 8/2017 | Macintosh et al. |
| 2017/0278126 A1 | 9/2017 | Rowley et al. |
| 2018/0095940 A1* | 4/2018 | Meixner ............... H04L 51/046 |
| 2018/0174299 A1* | 6/2018 | Agrawal ............... H04N 13/106 |
| 2018/0330364 A1* | 11/2018 | Driscoll ................ G06Q 20/36 |
| 2019/0012612 A1* | 1/2019 | Skeen ................ G06Q 30/0643 |

\* cited by examiner

AUTOMATIC INVOICE CREATION FOR CHAT AND SOCIAL PLATFORMS

RELATED MATTERS

This application is a continuation of U.S. application Ser. No. 15/850,747, filed Dec. 21, 2017, which claims priority benefit of U.S. Provisional Patent Application Ser. No. 62/566,258, titled "Invoice Creation for Chat and Social Platforms" filed on Sep. 29, 2017.

TECHNICAL FIELD

The present application generally relates to the field of communication systems, and more particularly, to using invoice creation for transactions initiated via communication over online social networking platforms.

BACKGROUND

Online social networking platforms facilitate communication, such as via chat sessions, between chat applications in a communication system. A user of a chat application can communicate, over a communication network, with a user of another chat application by transmitting communication to, and receiving communication from, the chat session. Users of the chat applications can also have accounts at financial institutions. However, users can have difficulty performing transactions that are initiated via the chat sessions, as well as using their financial accounts, without using external applications. For example, users can have difficulty communicating via chat applications in a chat session for initiating and finalizing transactions such as buying or selling goods and/or services. Furthermore, formalizing and/or documenting such transactions that are initiated via the online social networking platforms is difficult.

BRIEF DESCRIPTION OF THE DRAWINGS

The present embodiments may be better understood, and numerous objects, features, and advantages made apparent to those skilled in the art by referencing the accompanying drawings.

Figure 1:
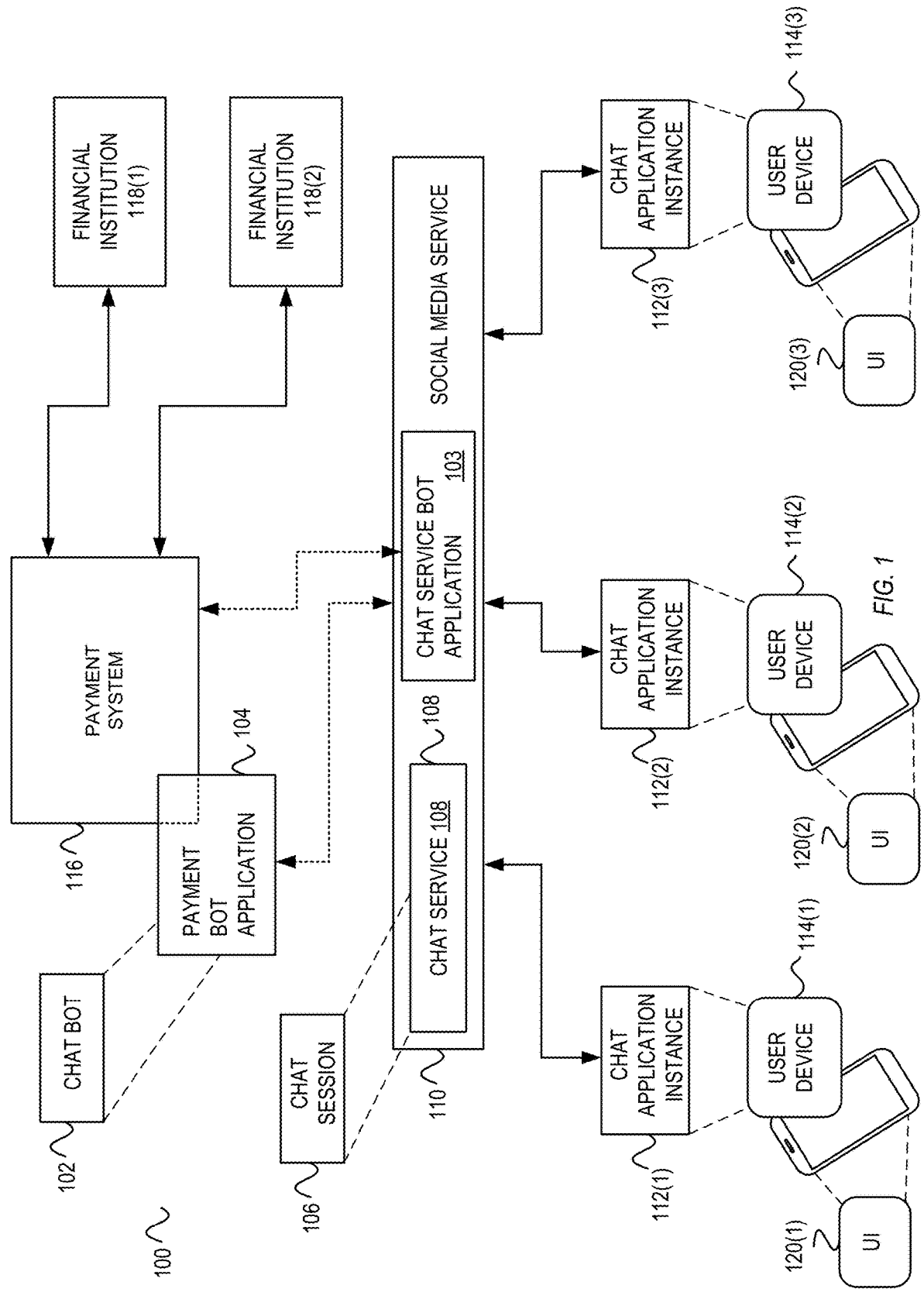
FIG. 1 is a system diagram of a networked system suitable for creating and using invoices for transaction initiated using social media service platforms.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The description that follows includes exemplary systems, methods, techniques, instruction sequences and computer program products that embody techniques of the present inventive subject matter. However, it is understood that the described embodiments may be practiced without these specific details. For instance, although some examples refer to social media services, other types of media services are contemplated, such as online news services. Furthermore, the described embodiments can be used for sharing of information regarding transactions over social media service platforms. The described embodiments can be also used for completing the transaction, such as by initiating a fund transfer associated with the transaction.

Chat sessions facilitate communication between instances of chat applications running on various devices in a communication system. A user of one instance of a chat application can communicate, over the communication system, with a user of another instance of a chat application by transmitting and receiving communication to/from the chat session. For example, the communication system facilitates the transmission of chat texts, over a communication network, between the instances of the chat applications and the chat session. The chat session, which can be hosted by a chat service, can facilitate communication between the multiple instances of the chat applications. Each chat application, such as a SLACK chat application, or a FACEBOOK MESSENGER application, can be hosted by a user device. In some cases, the communication may be between multiple instances of the same type of chat application. In other cases, the communication may involve instances of multiple different types of chat applications. The user device can be any type of a personal device such as a mobile phone, tablet, or other computing device.

Thus, multiple SLACK chat application instances can communicate with each other by transmitting chat texts to, and receive chat texts from, a SLACK chat session. The chat service can be a part of a social media service. For example, the chat service can be a SLACK chat service that is a part of a SLACK team collaboration tool, or a FACEBOOK MESSEGENGER chat service that is a part of a FACEBOOK social networking service. The chat service itself can be further hosted by a server or another type of a computing device.

Users (such as sellers and/or buyers) and/or merchants may also utilize other types of service providers involved in online communications, including social networking, media sharing, and/or microblogging types of services that allow users and/or merchants to communicate with other users/merchants, post visual data and comments, and/or provide notifications or updates to other users. Thus, these other types of service providers may include online social networking services, such as FACEBOOK®, INSTAGRAM®, IMIGUR®, TWITTER®, SNAPCHAT®, or other type of media sharing, microblogging, or social networking service. The social networking service may allow for merchants and other selling entities to post data, which may correspond to an item for sale. The posts by the seller may further allow other users to comment on the posts of items. The posts may include an image, video, or other data, as well as a description, which may include an item description, price, variations (e.g., size, color, etc.), shipping information, or other sales information. Users may comment on the posts as a process to purchase the item, where a transaction processor may process payments for items requested for purchase by users through a social networking service, as discussed herein.

Is some embodiments, a bot application can communicate, via a chat bot, with the chat session and simulate a chat application instance for communicating with the other chat application instances. For example, the bot application may simulate a SLACK chat application instance for communicating, via a SLACK chat session, with other SLACK chat application instances. The chat bot can send and receive chat texts from the chat session. In some embodiments, a bot application can be implemented as a part of the social networking service.

However, with various forms of communication over the chat sessions, users of chat applications may find it tedious to negotiate with each other in real time via chat sessions. It may be difficult to create and use invoices for transactions that are initiated via chat sessions. Furthermore, users of chat applications may find it tedious to transfer funds between each other. For example, a user of a first chat application instance in a chat session may not be able to easily transfer funds, over the communication network, to a user of a second chat application instance of that chat session. The methods and systems described herein are directed to detecting that chat texts accessed at a chat session are directed to negotiation of a transaction, and creating an invoice for the transaction.

The chat text can be provided to the chat session from one or more chat application instances. A bot application can access this chat text and determine the transaction from the chat text, e.g., the chat text is directed to a transaction negotiation. The transaction can be for a transfer of an item or a service between a first user associated with the first chat application instance and a second user associated with the second chat application instance. The bot application can access and analyze an image associated with the transaction to determine first and second image elements that are associated with the transaction. The bot application can, responsive to the determination that the chat text is directed to transaction negotiation and/or of the image elements, generate an invoice for a first transaction portion that is associated with the first image element.

The bot application can provide the invoice, via the chat session, to the first and/or second chat application instance. The bot application can, responsive to determining that the first transaction portion is performed, determine to indicate, via the image, that the first image element is unavailable for additional transactions. Thus, the invoice can be provided to chat application instances to expedite completion of the transaction, including transaction funding, as well as to document the transaction. The following description, and associated Figures, illustrates various embodiments directed to the ideas listed above.

FIG. 1 is a system diagram of a networked system suitable for creating and using invoices for transaction initiated using social media service platforms. In an overview of the system diagram 100, a chat session 106 is hosted by a chat service 108 (e.g., a social networking service), which in turn can be hosted by a social media service 110. Chat application instances 112(1)-112(3) (e.g., instances of the same type of chat application, instances of more than one type of chat application) can communicate with each other via the chat session 106. For example, the chat application instance 112(1) can transmit a chat text to the chat session 106 to the chat application instance 112(2) and/or the chat application instance 112(3). The chat bot 102 simulates a chat application instance when communicating with the chat application instances 112(1)-112(3). Each of the chat application instances 112(1)-112(3) may be hosted by a respective user device 114(1)-114(3). For example, the chat application instance 112(1) is hosted by the user device 114(1). Each of the user devices 114(1)-114(3) can also display a user interface (UI) 120(1)-120(3), respectively. Each of the UIs 120(1)-120(3) can display visual elements, such as chat texts of the chat session 106. Each of the UIs 120(1)-120(3) can also receive user input, such as selection from the user. It is noted that each of the user devices 114(1)-114(3) can also receive input from the user via other input elements, such as via a keyboard, mouse, microphone (e.g., from a voice command), among others.

The methods described herein for creating and using invoices for transaction initiated using social media service platforms (such as discussed below with reference to FIG. 2) can be implemented at a payment bot application 104 and/or at the chat service bot application 103. For the purposes of this disclosure, the term "bot application" will refer to the payment bot application 104 and/or to the chat service bot application 103, unless specified otherwise. In some embodiments, both the payment bot application 104 and the chat service bot application 103 are used. In some embodiments, only one of the payment bot application 104 or the chat service bot application 103 is used.

In one embodiment, the payment bot application 104 can be implemented as a part of the payment system 116. For example, a server that hosts the payment system 116 can also host the payment bot application 104. The server can be implemented on a single computing device, or on multiple computing devices (e.g., using distributed computing devices or a cloud service). The payment bot application 104 can instantiate the chat bot 102, as well as other chat bots. The payment bot application 104 can interface with the payment system 116 to provide instructions to the payment system 116 and receive financial information regarding users from the payment system 116. In some embodiments, the payment bot application 104 can be hosted by another server, and communicate with the payment system 116.

In some embodiments, the chat service bot application 103 can be hosted by the social media service 110. The chat service bot application 103 can access the chat session directly, i.e., without using a chat bot. The chat service bot application 103 can also natively interface with the chat application instances 112(1)-112(3), such as to cause one or more of the chat application instances 112(1)-112(3) to display additional content such as UI elements, and to receive additional user selection. The additional content and/or the additional user selection can be facilitated by the chat application instances 112(1)-112(3) using techniques outside of accessing chat texts, as discussed below with reference to FIGS. 3-10.

The payment system 116 can provide financial services, such as a fund transfer (e.g., a transfer of a certain monetary amount), to users. The payment system 116 can include payment accounts, each of which can be associated with a user. For example, a first user can be associated with a first payment account, and a second user can be associated with a second payment account at the payment system 116. The payment system 116 can facilitate the fund transfer from the first payment account to the second payment account. The payment system 116 can receive instructions from the payment bot application 104 (and/or from the chat service bot application 103) to transfer money from a payment account that is linked with a first chat account (i.e., with a first user) to another payment account that is linked with another chat account (i.e., with another user). The payment system 116 can be implemented by PAYPAL or another online payment system that allows users to send, accept, and request fund transfers.

In the example illustrated in FIG. 1, the payment system 116 interfaces with one or more financial institutions, such as a financial institution 118(1) and a financial institution 118(2) (referred to collectively as financial institutions 118). Financial institutions 118 can provide financial services to users. Financial institutions 118 can be implemented as banks, credit unions, other deposit-taking institutions that accept and manage deposits and make loans, and other financial service providers. In some embodiments, financial institutions 118 can include credit card networks, e.g., for funding transfer of money between users. In some embodiments, financial institutions 118 may include a provider of purchasing power that is associated with a loyalty program. In one embodiment, the payment system 116 can access funds associated with the first payment account (of the payment system 116) by accessing the financial institution 118(1), and transfer these funds to a second payment account of the payment system 116 by accessing the financial institution 118(2).

A service or an application (such as the payment bot application 104) can be hosted by a combination of software and hardware. It is noted that the same term "hosting" is used herein to describe both software hosting and hardware hosting. When software hosting, a software service such as the chat service 108, can instantiate and manage multiple chat sessions, such as the chat session 106 and other chat sessions. When hardware hosting, a computing device (such as a server or a user device) can provide resources such as memory, communication, and execution resources for execution of instructions.

The bot application can access chat texts that are provided to the chat session 106 by the chat application instances 112(1)-112(3). The bot application can then determine, based on analysis of the chat texts, that transaction negotiation is taking place. In some embodiments, the chat application instance 112(1) can provide extensions for invoice creation (e.g., at the seller at the chat application instance 112(1)) that are accessible from the UI 120(1). The bot application can determine that the transaction includes several portions. The bot application can also generate an invoice for the transaction, where the invoice includes several elements that correspond to the respective transaction portions. The bot application can access a photo that is provided by a product or a service provider (e.g., a seller) for the transaction. The bot application can then associate transaction portions with image elements of the image. For example, the bot application can perform image analysis and determine that a first portion of the transaction is associated with a first element of the image, and a second portion of the transaction is associated with a second element of the image. The bot application can associate invoice elements with corresponding image elements.

The bot application can generate the invoice based on transaction details. The bot application can, for example, access and analyze the chat texts in the chat session 106, and determine information for automatic generation of the invoice. The bot application can prefill details of the invoice such as the photo of the items being sold, price, description, among other elements. The bot application can also determine payment accounts at the payment system 116 for the buyer and/or the seller, and pre-populate these into the invoice for easy processing. The seller can, such as via the UI 120(1), provide and/or confirm details of the transaction, such as the price, photo, description, etc. The invoice can be stored by the bot application, such as into a database at the payment system 116. In some embodiments, the payment bot application 104 can post the generated invoice into the chat session 106, and present it to the buyer for access via the chat application instance 112(2). In this implementation, the buyer can select and pay for the invoice by accessing the chat session 106 via the chat application instance 112(2).

In some embodiments, the chat service bot application 103 can communicate the generated invoice to the chat application instance 112(1) without using the chat session 106. The chat service bot application 103 can cause the chat application instance 112(1) to display additional UI elements to facilitate custom processing of the invoice. For example, the chat service bot application 103 can cause the chat application instance 112(2) to provide the invoice and prompts for receiving user selection of the image elements. The UI 120(2) can receive a user selection of a certain image element, such as a selection tag indicating the first element. The chat application instance 112(2) can then communicate the user selection to the chat service bot application 103. In some embodiments, the invoice can include an embedded link (e.g., implemented as a button) for access, directly from the chat application instance 112(2) of the buyer. In some embodiments, the embedded link can be implemented via the extensions, and thus can be accessed through the buyer's chat application instance 112(2) to purchase the item. The embedded link can be linked to the buyer's payment account (e.g., with a selected funding source) at the payment system 116. In this implementation, the buyer can select and pay for the invoice by via the chat application instance 112(2), without accessing the chat session 106.

Although the discussion refers to generation of invoices within chat service environments, other implementations are contemplated. For example, the methods discussed can be applied to embedded third party listing and invoicing creation within a native application. In some implementations, the bot application can access chat texts between the chat application instance 112(2) and an e-commerce bot, and create invoices for these transactions. As discussed herein, the user device can extend voice-activated and/or gesture-activated invoicing, such as provided by AMAZON ALEXA/ECHO, or OCULUS Virtual Reality systems. The bot application can provide for easier authentication of users for the transaction/invoicing, without needing to access a separate app or web page to create and/or access an invoice for a transaction that is being negotiated via the chat session. Access to the invoicing can be a prong in a multi-step authentication process for in-chat payments/transactions. The bot application can, as discussed herein, provide access to payments via user's accounts at the payment system 116 (or at another payment system) directly from the invoice, e.g., without a need to access a separate app or web page.

Figure 2:
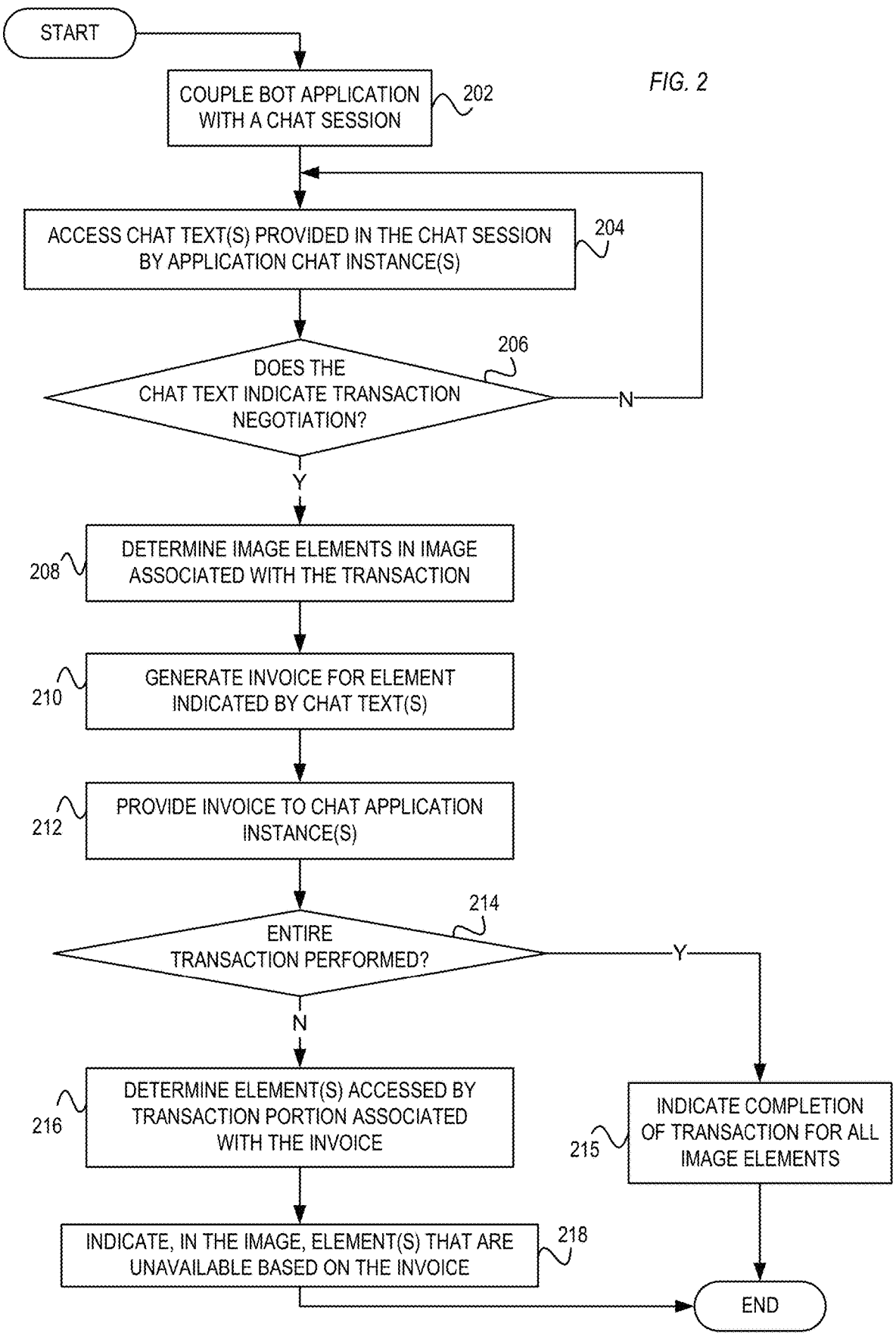
FIG. 2 is a flow diagram illustrating embodiments of operations for creating and using invoices for transaction initiated using social media service platforms.

FIG. 2 is a flow diagram illustrating embodiments of operations for creating and using invoices for transaction initiated using social media service platforms. The method of FIG. 2 is described with reference to the systems and components described in FIG. 1 (for illustration purposes and not as a limitation). The example operations can be carried out by the payment bot application 104 and/or by the chat service bot application 103.

Beginning with 202, a bot application is coupled with a chat session. As discussed above with reference to FIG. 1, the bot application can be implemented as a payment bot application 104 or as a chat service bot application 103. In embodiments where the bot application is implemented as the chat service bot application 103, the chat service bot application 103 can directly access (e.g., without using another chat bot) the appropriate chat session 106, e.g., via the chat service 108 that interfaces with the chat application instance 112(1). The chat service bot application 103 can be hosted by the social media service 110 and/or be integrated with the chat service 108.

In embodiments where the bot application is implemented as the payment bot application 104, coupling of the payment bot application 104 with the chat session 106 can include registering the payment bot application 104 with the chat service 108 and/or configuring the payment bot application 104 for communication over the chat session 106 via the chat bot 102. In some embodiments, the payment bot application 104 can also access an initial chat text that is provided to the chat session from the chat application instance 112(1). The initial chat text can indicate a user's intent to initiate the transaction.

In some embodiments, the payment bot application 104 can be associated with multiple payment systems. Based on the initial chat text, the payment bot application 104 can select the payment system 116 from the multiple payment systems for processing a payment transaction associated with this transaction. For example, the payment bot application 104 can access mappings (e.g., as stored at a database) and select a certain mapping that maps the payment system 116 with the transaction. The mappings can associate certain types of payment transaction to a respective payment system. The mapping can be selected by the payment bot application 104 based on a merchant, seller, and/or type of transaction indicated by the initial chat text.

In some embodiments, multiple payment bot applications can monitor the chat session 106. Based on the initial chat text, one or more of the multiple payment bot applications can initiate a payment system selection procedure for selecting a certain payment system. Each of the multiple payment bot applications can be associated with one or more payment systems. During the payment system selection procedure, the payment bot applications can select the payment system 116 for the transaction.

At 204, the bot application accesses a chat text provided in the chat session. With reference to FIG. 1, the payment bot application 104 can access, via the chat bot 102, chat texts provided in the chat session 106 by the chat application instances 112(1) and/or 112(2). In some embodiments, the chat service bot application 103 can access the chat texts directly, e.g., without using a chat bot.

At 206, the bot application determines whether the chat text indicates transaction negotiation. The bot application can perform analysis on the chat text to determine intent of the user. The determination of transaction negotiation may be accomplished based on recognition of particular characters, words, phrases, patterns, emojis, and/or other symbols within the chat text(s). If the bot application determines that the chat text indicates the transaction negotiation, the flow continues at 208, otherwise the flow continues at 204.

At 208, the bot application determines image elements in image associated with the transaction. The bot application can receive a photo (or another type of an image that depicts the items offered by the transaction) from the chat application instance 112(1) that is associated with the seller/provider of the transaction. The bot application can determine image elements in the photo, such as based on image analysis and/or correlation of the chat text to the transaction. In other embodiments where the image is not provided by the seller, the bot application can access, such as via the Internet, a generic image that depicts the items being offered. In other embodiments, the bot application can generate the image, including the image elements, based on analysis of the chat texts.

In some embodiments, the payment bot application 104 can receive the photo via the chat session 106 from the chat application instance 112(1). The payment bot application 104 can then perform image analysis on the image to determine the image elements. The payment bot application 104 can associate image elements with portions of the transaction, example of which is discussed below with reference to FIGS. 3-10.

In some embodiments, the chat service bot application 103 can receive the photo directly from the chat application instance 112(1). The chat service bot application 103 can receive additional information about the image elements, such as selected by the user via extensions that are provided to the chat application instance 112(1) by the chat service 108. For example, the UI 120(1) can receive user selections (e.g., selection tags) that indicate image elements, and their association to portions of the transaction.

At 210, the bot application generates an invoice for element indicated by the chat text(s). The bot application can generate the invoice which can include several elements that correspond to the respective transaction portions. The bot application can associate invoice elements (corresponding to respective transaction portions) with respective image elements. The bot application can determine transaction details for invoice generation based on analysis of the chat texts. The bot application can populate details of the invoice, including the image, price, and/or description, among other elements. The bot application can also determine payment accounts at the payment system 116 associated with the users of the chat application instances 112(1) and 112(2) (e.g., the buyer and the seller, respectively), and pre-populate these into the invoice for processing. Once generated, the invoice can be stored by the bot application, such as by using a database at the payment system 116. The seller can, such as via the UI 120(1), provide and/or confirm details of the transaction, such as the price, photo, description, and/or transaction portions and transaction elements, among others. The bot application can then generate the invoice based on the transaction details.

In some embodiments, the invoice can be associated with the entire image. In other embodiments, the invoice can be associated with one or more elements of the image on per-transaction portion basis (as explained with reference to FIG. 3 below). In some embodiments, the invoice is generated for the original transaction as indicated by the chat texts at 204. In some embodiments, the invoice is generated for a subset of the original transaction, e.g., as indicated by additional chat texts (e.g., subsequent to the communication at 204) and/or as specified via extensions at the chat application instance 112(2). The subset of the original transaction can indicate the image elements in which the potential buyer is interested.

At 212, the bot application provides the invoice to chat application instance. Depending on the implementation, the payment bot application 104 or the chat service bot application 103 can provide the invoice to the chat session 106 via the chat bot 102, for access by the chat application instance 112(2) (and optionally by the chat application instance 112(1)). Alternatively, the chat service bot application 103 can provide the invoice directly to the chat application instance 112(1) (and optionally to the chat application instance 112(1)), i.e., without using the chat session 106. In some embodiments, the invoice can be provided to the chat application instance 112(1) for approval (e.g., by the potential seller). Once the bot application receives the approval, the bot application can then provide the invoice to chat application instance.

In some embodiments, the chat service bot application 103 can receive, from the chat application instance 112(2), a selection tag indicating a certain image element. The selection tag can be provided via the chat application instance 112(2) extensions, and be associated with a portion of the transaction. As discussed in examples below, if an invoice lists two elements that correspond to two separate strollers, the buyer can provide a first selection tag that is associated with a second of the strollers. In some embodiments, the payment bot application 104 can receive, via the chat bot 102, the selection tag that is provided to the chat session. This chat session selection tag can be encoded by the chat application instance 112(1) (e.g., in a chat text provided to the chat session 106) and then decoded by the payment bot application 104.

In some embodiments, the bot application can determine when the potential buyer is accessing a certain image element, and thus can determine intent of the potential buyer to purchase the item corresponding to the image element. The bot application can then indicate, via the image, that the first element is temporarily unavailable for the additional transactions.

At 214, the bot application determines whether the entire transaction is performed. For example, if the transaction includes two portions, the bot application can determine whether both portions are performed, or just one of the portions. The user at the chat application instance 112(2) can select If the bot application determines that the entire transaction is performed, the flow continues at 216, otherwise the flow continues at 215. At 215, the bot application can indicate completion of the transaction for all image elements. For example, the bot application can generate and place an overlay using the words "SOLD" on the entire image, or the bot application can simply stop providing the image to the chat session 106 and/or to the chat application instances 112(2)-112(3).

At 216, the bot application determines element(s) accessed by transaction portion associated with the invoice. With reference to FIGS. 3-7 below, the bot application can determine whether a user of the chat application instance 112(2) indicates a subset or all of the invoice elements. At 218, the bot application indicates, via the image, element(s) that are unavailable based on the invoice. The bot application can update the image by updating the image and providing the updated image to the chat application instances. The bot application can generate an overlay for the image and then provide the overlay for display. In some embodiments and with reference to step 212, the bot application can indicate that the first element is unavailable for the additional transactions by changing the indication of the first element from being temporarily unavailable to being unavailable. Some of the implementations of indicating that image elements are unavailable are discussed below with reference to FIGS. 3 and 7 below.

Figure 3:
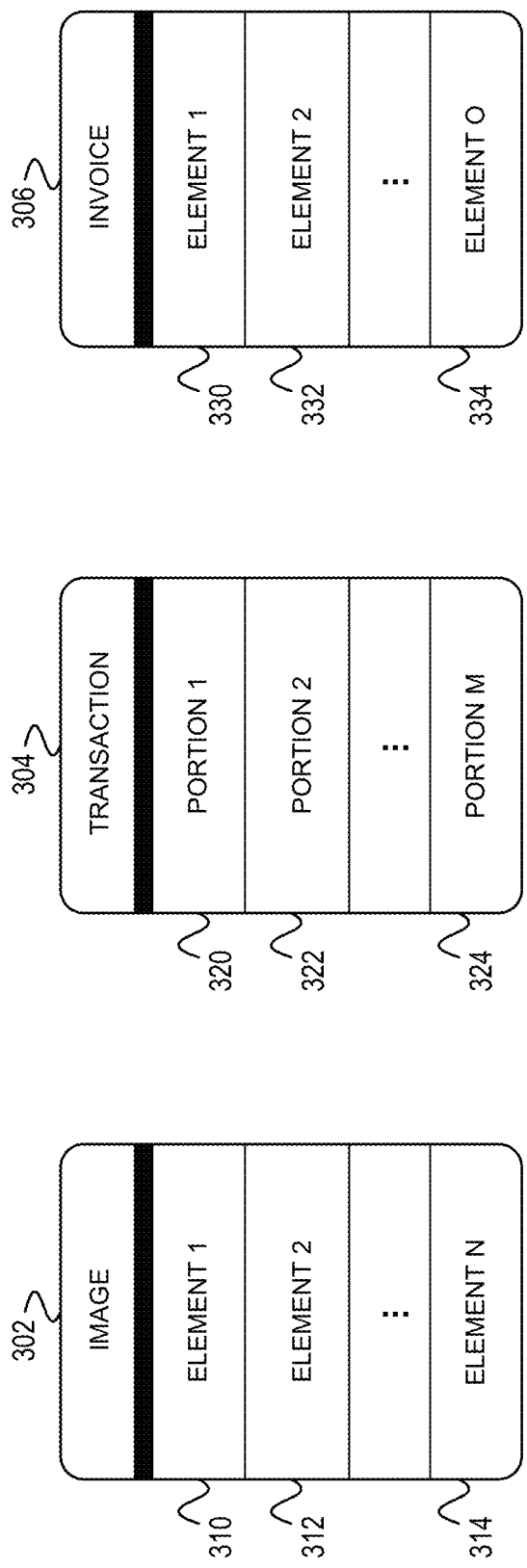
FIG. 3 is a diagram illustrating example relationships between transaction portions, image elements, and invoice elements.

FIG. 3 is a diagram illustrating example relationships between transaction portions, image elements, and invoice elements. FIG. 3 illustrates examples of organization and relationships between entities of an image 302, a transaction 304, and an invoice 306. The image 302 can include a first image element 310, a second image element 312, through image element N 314. The transaction 304 can include a first transaction portion 320, a second transaction portion 322, through transaction portion M 324. The invoice 306 can include a first transaction element 330, a second transaction element 312, through transaction element O 334.

In some embodiments, there can be a one-to-one relation between elements and portions of these entities. For example, the first image element 310 can be associated with the first transaction portion 320 and the first invoice element 330. In other embodiments, the relation can be varied. For example, initially, the transaction 304 can include only one portion indicating both image elements 310 and 312 of the image 302, where the first invoice element 330 is associated with both the first and the second image elements 310 and 312. The bot application can then determine to modify a relationship between these entities, such as based on the chat texts and/or on the selection of the image elements by the buyer. If the buyer selects only a second image element for a purchase transaction, the bot application determines to divide an initial transaction into two separate portions, the first transaction portion 320 for the first image element 310 (that is not selected by the buyer) and the second transaction portion 322 for the second image element 312 (that is selected by the buyer).

Figure 4:
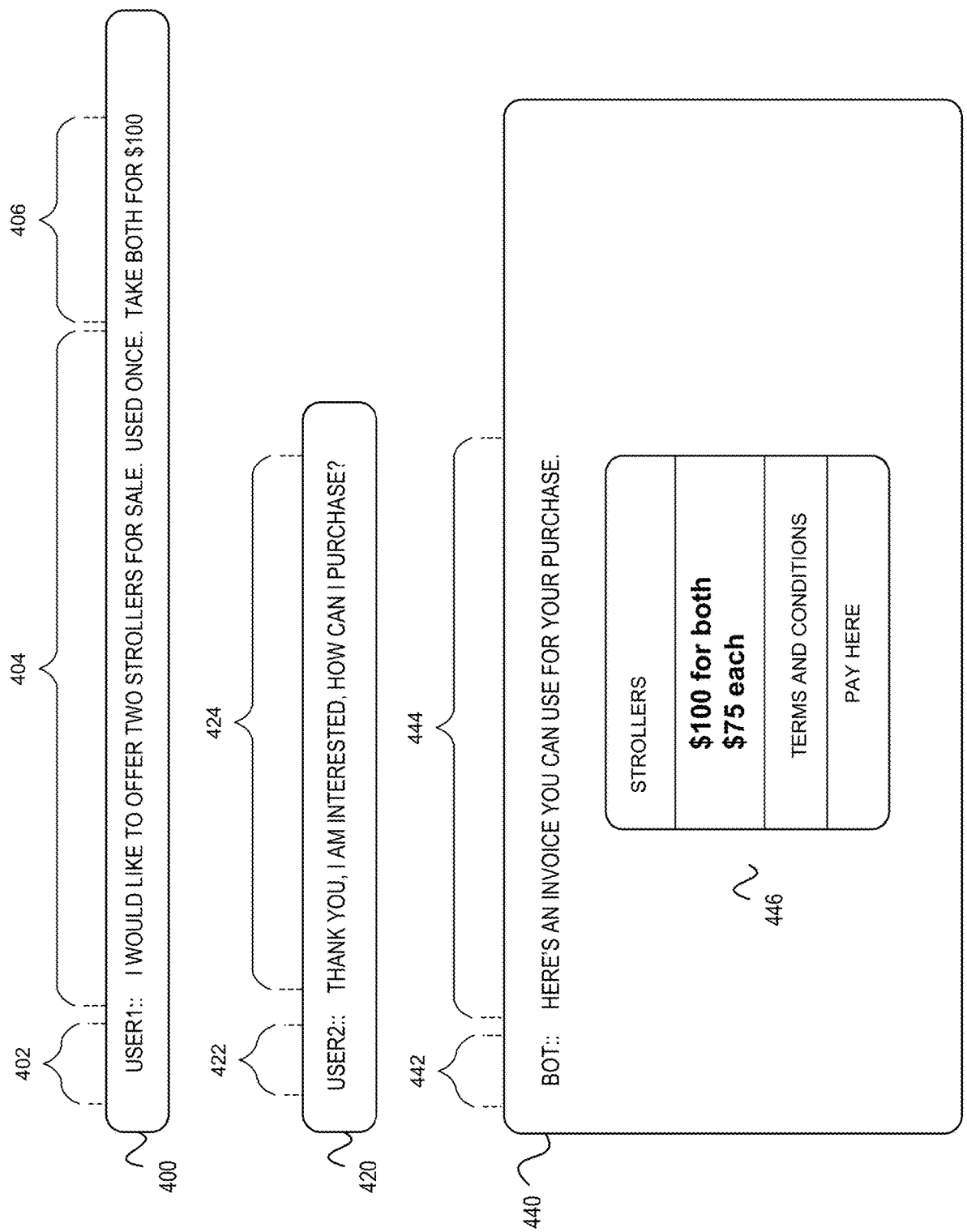
FIG. 4 is a diagram illustrating communication accessed at a chat session for creating and using invoices for transaction initiated using social media service platforms.

FIG. 4 is a diagram illustrating communication accessed at a chat session for creating and using invoices for transaction initiated using social media service platforms. Chat text 400 illustrates a chat text that can be provided, by the chat application instance 112(1), to the chat session 106. Chat text 420 illustrates another chat text that can be provided, by the chat application instance 112(2), to the chat session 106. Chat text 440 illustrates another chat text that can be provided, by the chat bot of the payment bot application 104, to the chat session 106. The chat texts 400 and 420 illustrate a negotiation of a transaction for a sale of two strollers, as also discussed in FIGS. 5-8 below. The bot application can access the chat texts 400 and 420 and parse chat text portions 402-406 and 422-424 to determine the transaction.

The chat text 400 can include chat text portions (also referred to as "portions") 402-406. The portion 402 of "user1:" indicates that the chat application instance 112(1) is transmitting the chat text 400. The portion 404 can be parsed and analyzed by the bot application to determine intent of the seller (i.e., the user of the first user device 114(1)) to negotiate a transaction. The portion 406 can be parsed and analyzed by the bot application to determine potential image elements. The potential image elements can be used with image analysis to determine image elements of an image provided by the seller for the transaction. The chat text 420 can include portions 422 and 424. The portion 422 of "user2:" indicates that the chat application instance 112(2) is transmitting the chat text 420. The portion 424 can be parsed and analyzed by the bot application to determine intent of the buyer (i.e., the user of the second user device 114(2)) to participate in the transaction negotiation.

The chat text 440 can include portions 442-446. The portion 442 of "bot:" indicates that the bot application has generated the chat text 440. The portion 444 indicates that the bot application is providing an invoice for the transaction initiated at chat texts 400 and 420. The portion 446 includes the invoice for the transaction that is generated by the bot application based on the chat text 400, and also on other information that can be provided by the seller, including an image. The invoice indicates the items for the transaction, as well as a choice of transaction portions. It is noted that depending on the implementation, instead of being provided by the payment bot application 104 via the chat bot 102 to the chat session 106, the chat service bot application 103 can directly communicate the chat text 440 for access by the chat application instance 112(1) and/or 112(2).

Figure 5:
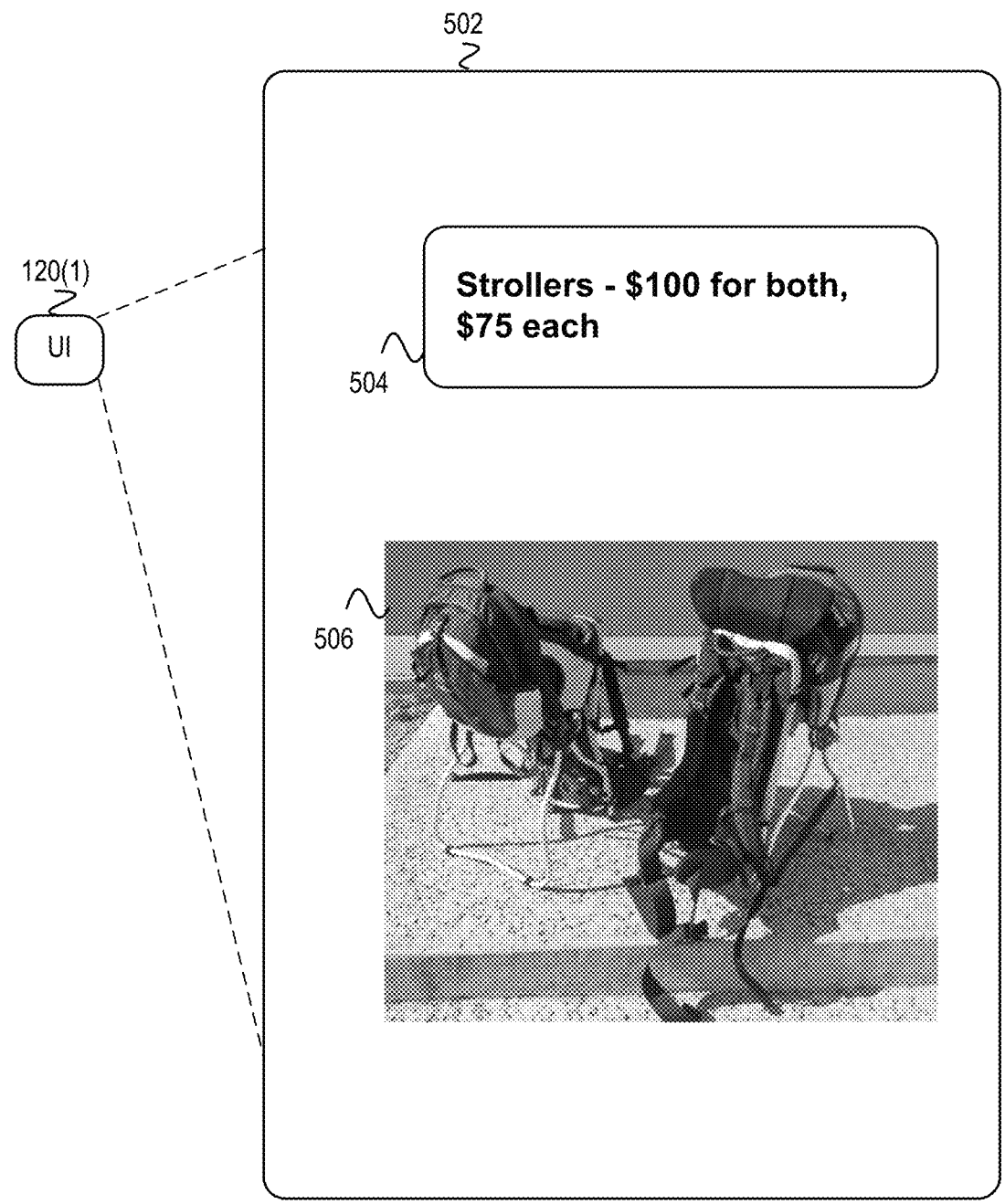
FIGS. 5-7 illustrate exemplary contents displayed by user interfaces (UIs) of user devices for initiating and processing of a transaction using social media service platforms.
Figure 6:
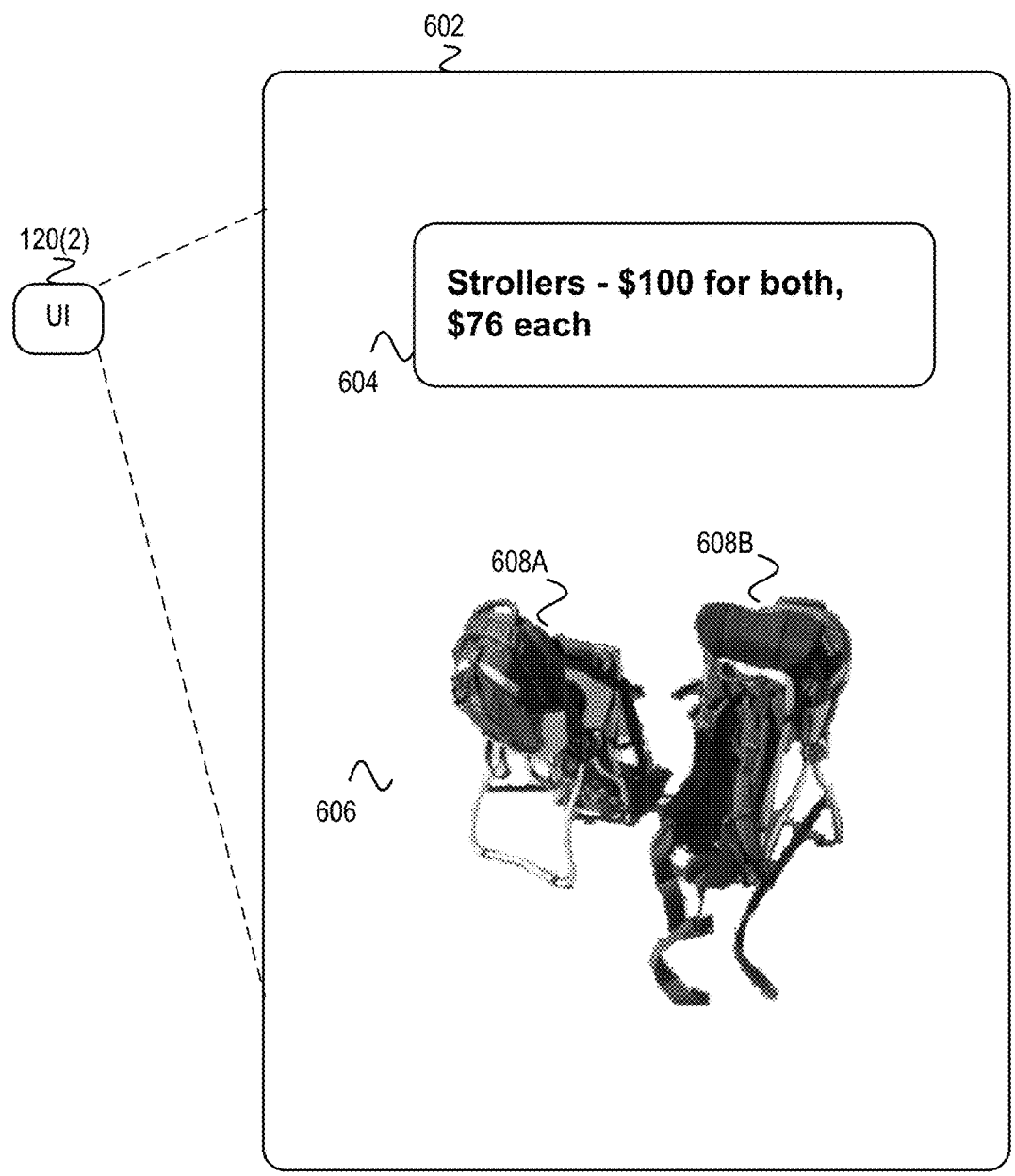
Figure 7:
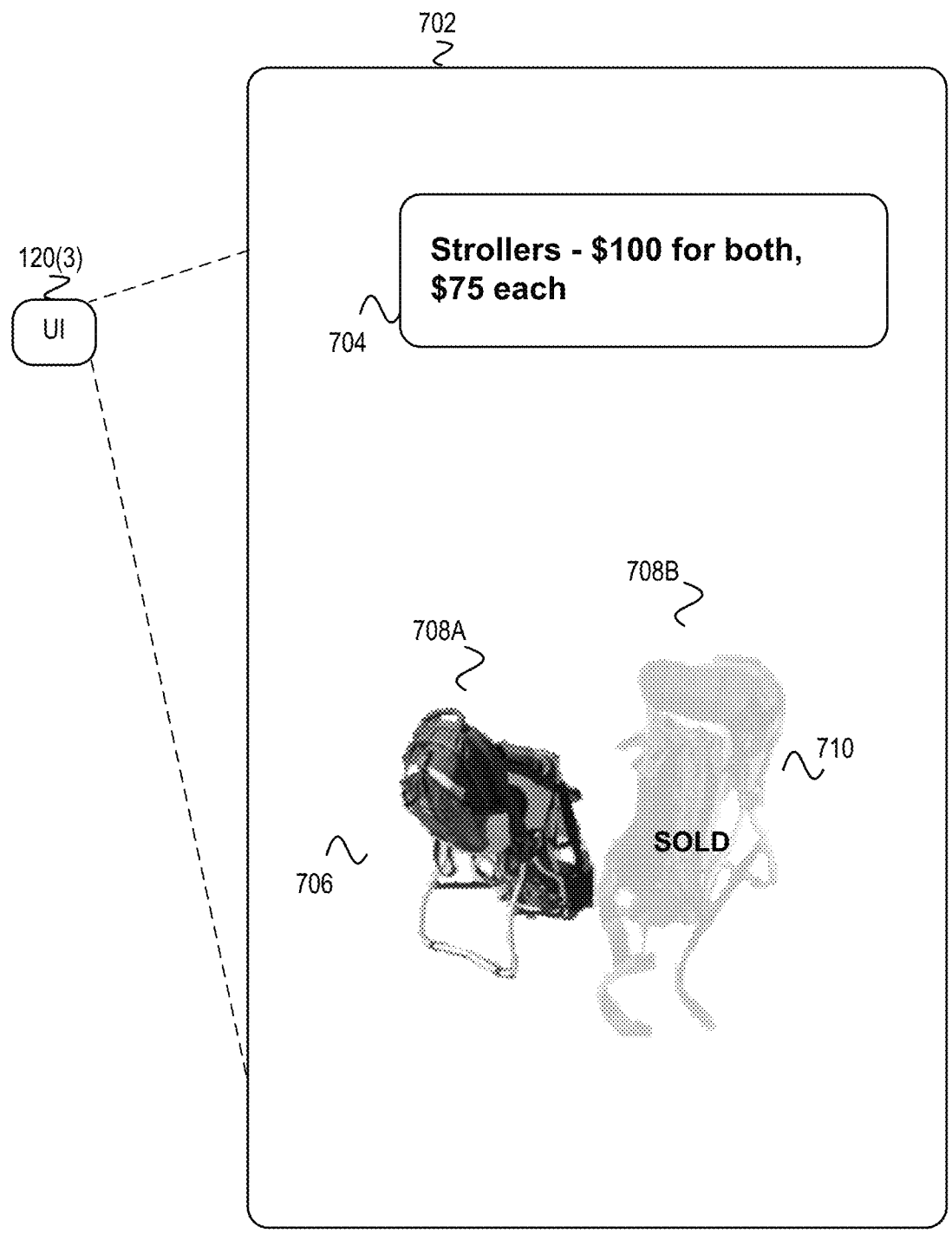

FIGS. 5-7 illustrate exemplary contents displayed by user interfaces (UIs) of user devices for initiating and processing of a transaction using social media service platforms. FIG. 5 illustrates a chat text 502 that can be provided by the seller via the chat application instance 112(1) as displayed on the UI 120(1). The chat text 502 include a description 504 of items and an image 506 of the items being offered in the transaction. The bot application can access the image 506 and then perform image processing to determine image elements for the transaction. The bot application can also use the chat text 504 to determine the image elements in the image 506, which are two strollers.

FIG. 6 illustrates a chat text 602 that are provided by the bot application to the chat application instance 112(2) as displayed in the UI 120(2). It is noted that similar chat text can be provided to other chat application instances, such as to the chat application instance 112(3) and/or to a chat group that is accessed by multiple chat application instances. The chat text 602 include a description 604 of strollers being offered via the transaction, including a first stroller 608A and a second stroller 608B. The chat text 602 also includes an image 606 that includes the first stroller 608A (i.e., the first image element) and the second stroller 608B (i.e., the second image element). In some embodiments, the UI 120(2) can receive a user selection (from the buyer) of the second stroller, such as via a selection tag. As noted above, an example of the invoice for the transaction of FIGS. 4-7 is shown at element 442 of FIG. 4.

FIG. 7 illustrates chat text 702 that are provided by the bot application after a first transaction portion is performed. Although FIG. 7 illustrates the chat text 702 being displayed by the UI 120(3) as displayed by the chat application instance 112(3), the chat text can be displayed by other chat application instances. The chat text 702 includes a description 704, which can be similar to the description 604. In some embodiments, the description 704 can be updated to indicate that only one of the two originally offered items are still for sale, such as by stating "Strollers—only one left, $75" instead. The chat text 702 also includes the image 706, where the first image element 708A of the first stroller is still shown as being available, and the second image element 708B of the second stroller is shown as being unavailable. In the implementation shown, the second stroller is being shown unavailable by displaying an overlay 710 (with the word "SOLD") over the second image element 708B.

Figure 8:
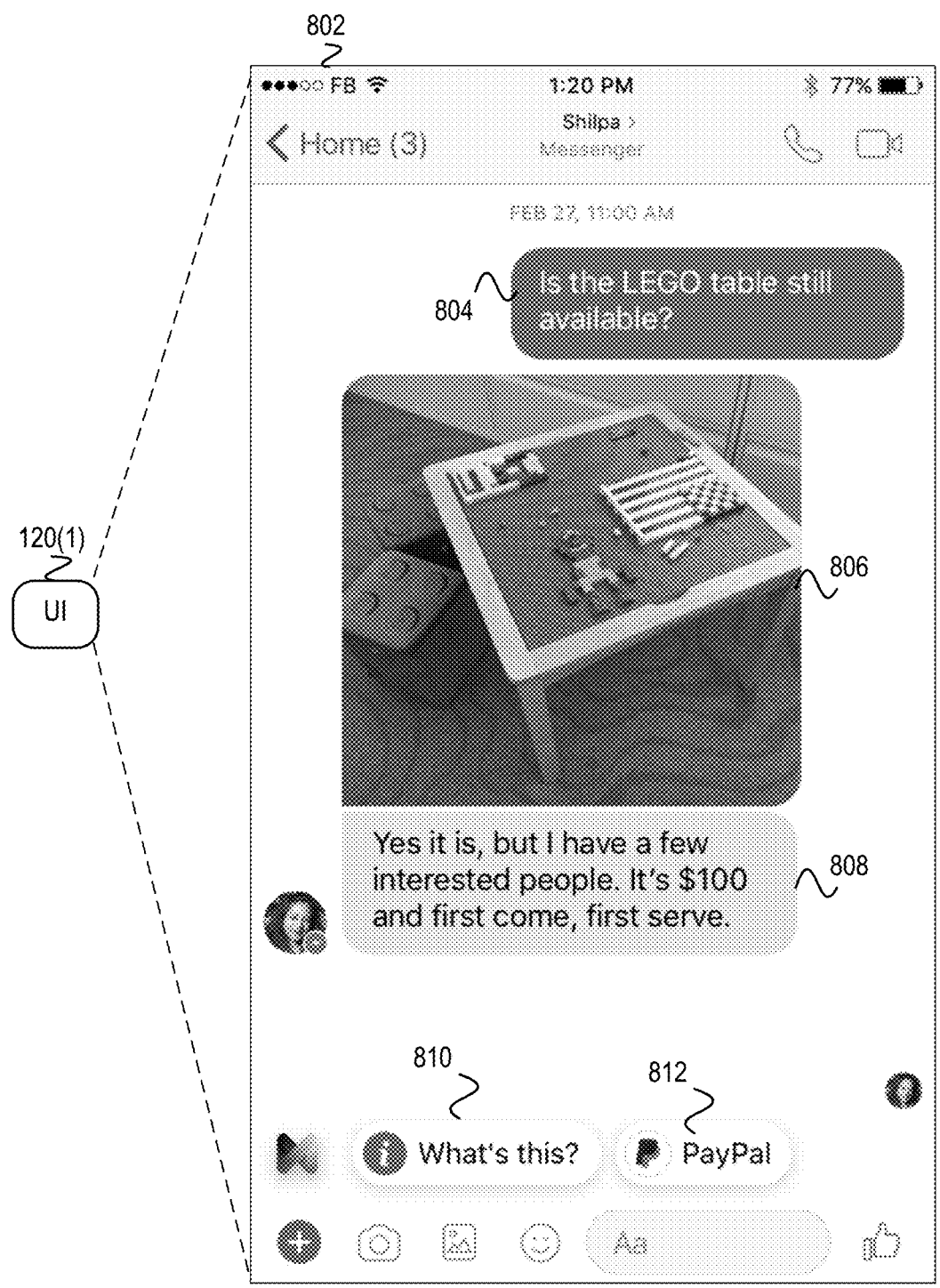
FIGS. 8-11 illustrate exemplary contents displayed by UIs of user devices for initiating and processing of another transaction using social media service platforms.

FIGS. 8-11 illustrate exemplary contents displayed by UIs of user devices for initiating and processing of another transaction using social media service platforms. In FIG. 8, chat texts 802 are displayed in the seller's UI 120(1). The chat text 802 includes a chat text 804 from a potential buyer's chat application instance 112(2). The chat text 806 includes an image (of an item for sale being a LEGO table) provided by the seller via the chat application instance 112(1), with an associated description 808 of the items in the image 806. In some embodiments, the bot application can analyze the chat texts 804-808, and determine that a transaction negotiation is being conducted, which can trigger the invoice creation process. The bot application can then provide prompts to the seller, via the chat application instance 112(1), to confirm initiating of the transaction. For example, the chat service bot application 103 can provide extensions implemented as an information control icon 810 and a transaction control icon 812. Upon receiving user input selecting the information control icon 810, the bot application can display information about the transaction and/or invoice creation process provided by the bot application. Upon receiving user input selecting the transaction control icon 812, the bot application can initiate the invoice generation process.

Figure 9:
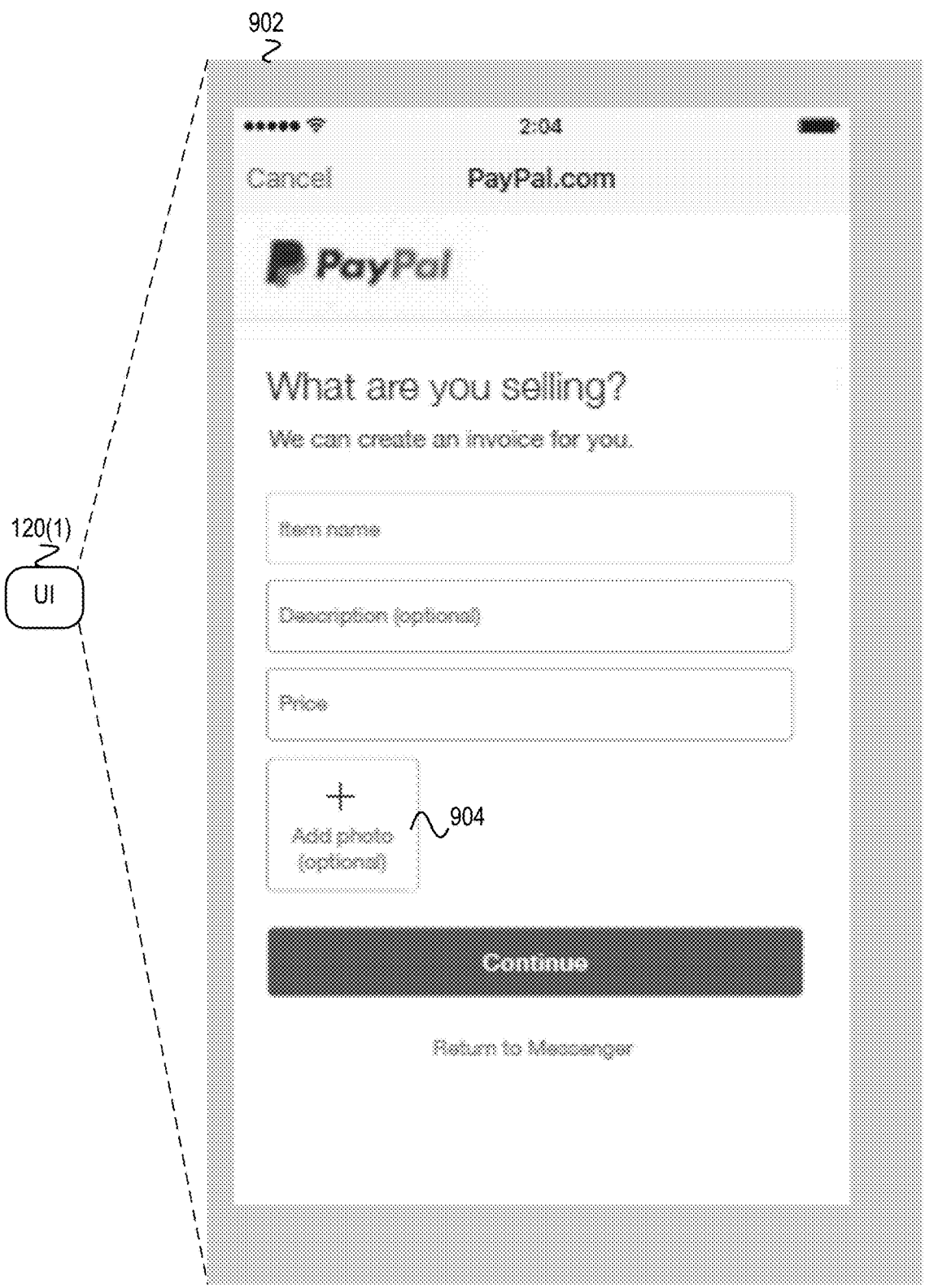
Figure 10:
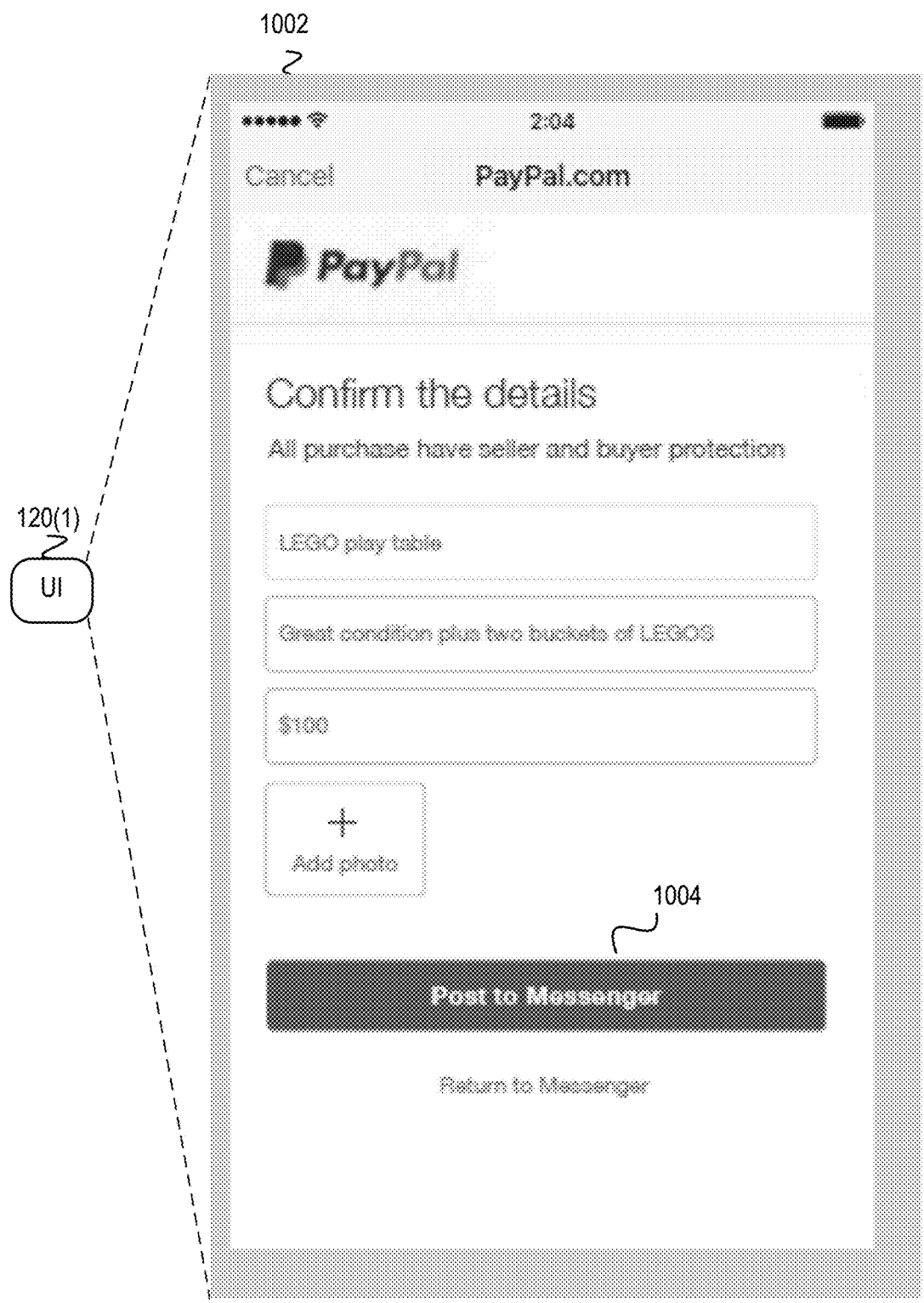
Figure 11:
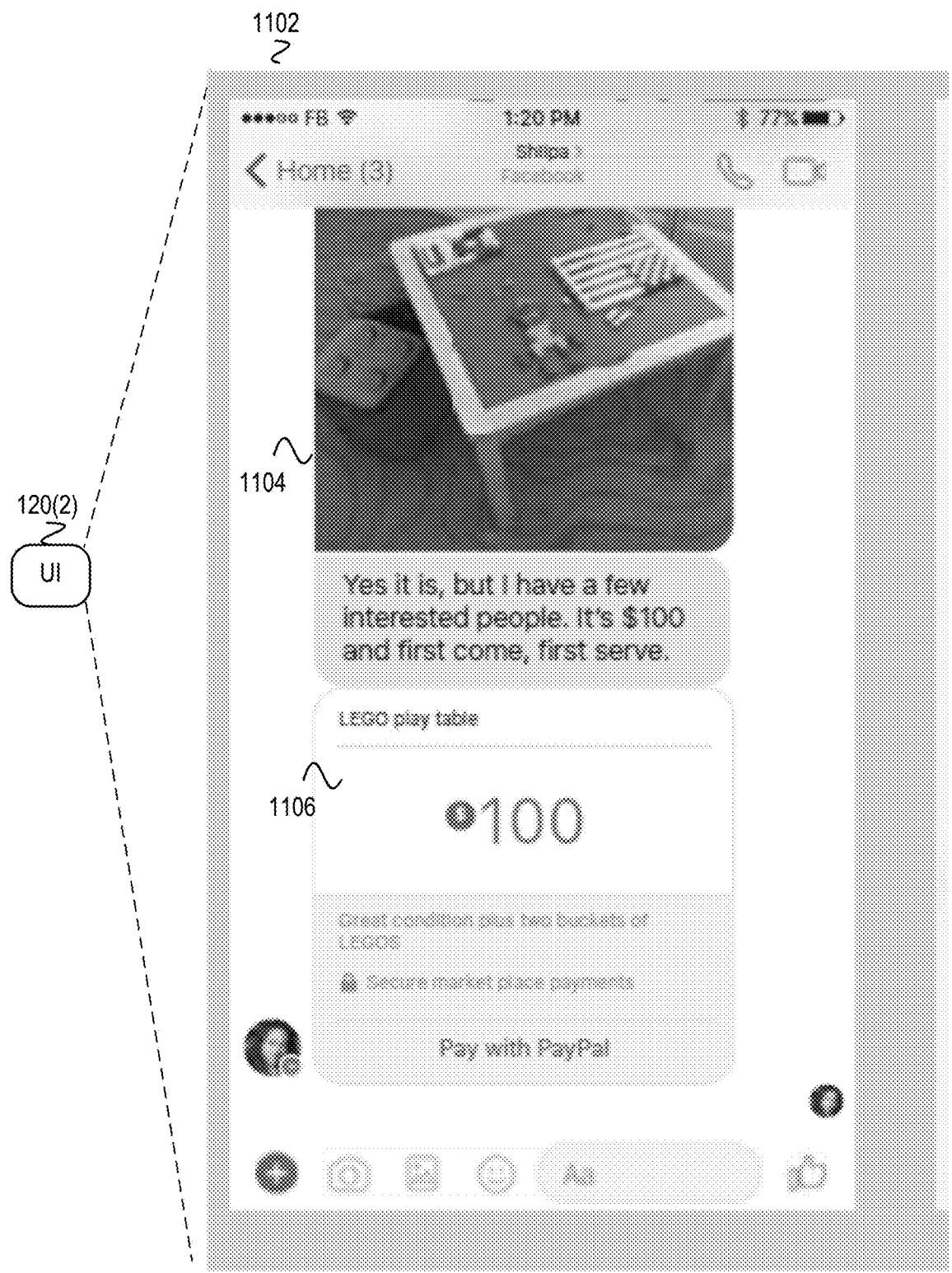

As FIG. 9 illustrates, the bot application can provide a chat text 902 with prompts for the seller to provide information (via the UI 120(1)) about the transaction, including the description of the items being offered, and a photo of the items. In some embodiments, the bot application can use the chat texts 804 and 808 and image 806 for the description and the photo. This information is then used by the bot application when generating the invoice. FIG. 10 illustrates the bot application providing, via the UI 120(1), a chat text 1002 prompting a seller confirmation of details for the generated invoice. FIG. 11 illustrates a chat text 1102 that is provided by the bot application to the buyer via the UI 120(2) the image 1104 and the invoice 1106. It is noted that in some embodiments and as discussed above, the bot application can generate the invoice without receiving and/or using the information of FIGS. 9 and 10.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flow diagram illustrations and/or block diagrams of methods, apparatus (systems) and computer program products according to embodiments of the inventive subject matter. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 12:
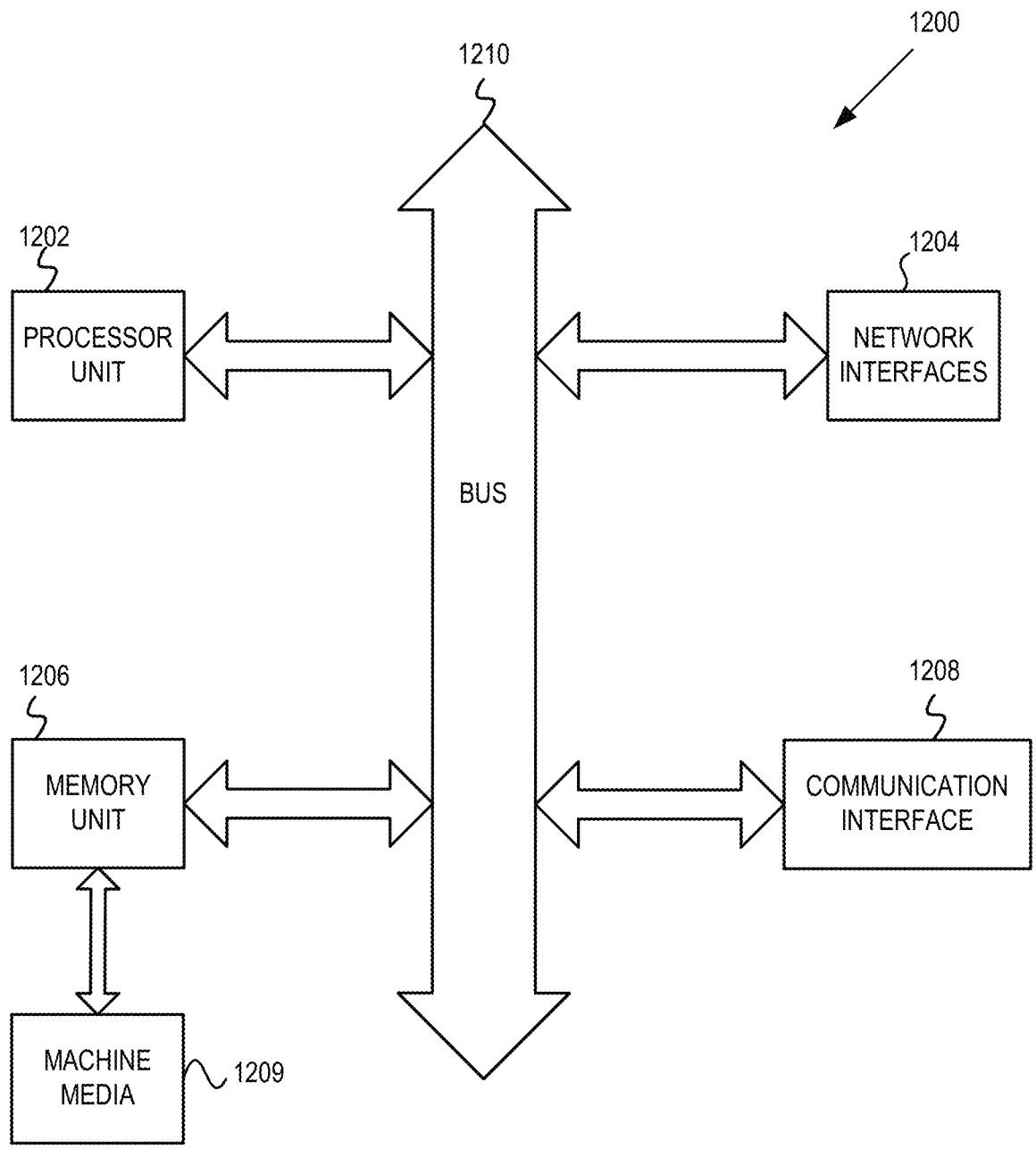
FIG. 12 is a block diagram of one embodiment of an electronic device used in the communication systems of FIGS. 1-11.

FIG. 12 is a block diagram of an exemplary embodiment of an electronic device 1200 including a communication interface 1208 for network communications. In some implementations, the electronic device 1200 may be one of a laptop computer, a tablet computer, a mobile phone, a powerline communication device, a smart appliance (PDA), a user device, a server, or another electronic system. The electronic device 1200 can include processor unit 1202 (possibly including multiple processors, multiple cores, multiple nodes, and/or implementing multi-threading, etc.). The electronic device 1200 can also include memory unit 1206. The memory unit 1206 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media 1209. Electronic device 1200 can also include bus 1210 (e.g., PCI, ISA, PCI-Express, HyperTransport®, InfiniBand®, NuBus, AHB, AXI, etc.), and a network interfaces 1204 can include wire-based interfaces (e.g., an Ethernet interface, a powerline communication interface, etc.). The communication interface 1208 can include at least one of a wireless network interface (e.g., a WLAN interface, a Bluetooth interface, a WiMAX interface, a ZigBee interface, a Wireless USB interface, etc.), In some implementations, electronic device 1200 may support multiple network interfaces—each of which is configured to couple the electronic device 1200 to a different communication network.

The memory unit 1206 can embody functionality to implement embodiments described in FIGS. 1-11 above. In one embodiment, the memory unit 1206 can include one or more of functionalities that facilitate communication in chat sessions using chat bots for automatic creation of invoices for transaction negotiated via social platforms. Any one of these functionalities may be partially (or entirely) implemented in hardware and/or on the processor unit 1202. For example, some functionality may be implemented with an application specific integrated circuit, in logic implemented in the processor unit 1202, in a co-processor on a peripheral device or card, etc. Further, realizations may include fewer or additional components not illustrated in FIG. 12 (e.g., video cards, audio cards, additional network interfaces, peripheral devices, etc.). Processor unit 1202, memory unit 1206, network interface 1204 and the communication interface 1208 are coupled to bus 1210. Although illustrated as being coupled to the bus 1210, memory unit 1206 may be coupled to processor unit 1202.

While the embodiments are described with reference to various implementations and exploitations, it will be understood that these embodiments are illustrative and that the scope of the inventive subject matter is not limited to them. In general, techniques for automatic creation of invoices for transaction negotiated via social platforms as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method, comprising:
    detecting that a chat session is initiated between a first user chat application associated with a first user and a second user chat application associated with a second user, the chat session being hosted by a chat service provider for facilitating communication between a plurality of chat applications that includes the first user chat application and the second user chat application, wherein one of the first user or the second user is a buyer in a transaction, and another one of the first user or the second user is a seller in the transaction;
    determining, at least in part via analyzing an image associated with the transaction, that a first image element of the image is associated with a first product of the transaction and that a second image element of the image is associated with a second product of the transaction;
    instantiating an invoice chat bot for simulating a third user chat application of the plurality of chat applications, different from the first user chat application and the second user chat application, within the chat session, wherein the invoice chat bot is a part of an entity that is different from the chat service provider, and wherein the instantiating comprises registering the invoice chat bot of the entity with the chat service provider;

determining that a chat text provided in the chat session is directed to a negotiation of the transaction;

causing, based on the determining that the chat text provided in the chat session is directed to the negotiation of the transaction, a transaction control icon associated with the entity to be displayed via a user interface of a seller portion of the chat session;

detecting a selection of the transaction control icon;

based on the detecting of the selection of the transaction control icon, generating an invoice for a first transaction portion of the transaction; and providing the invoice to at least one of the first user chat application or the second user chat application.

2. The method of claim 1, wherein said instantiating comprises determining a chat type of a chat service provider, wherein the invoice chat bot is selected from a plurality of invoice chat bots for the chat type.

3. The method of claim 1, further comprising:
determining at least one payment account for one or more of the first user or the second user;
populating the invoice with the at least one payment account; and
transferring funds from the at least one payment account without using another application on a device of the first user.

4. The method of claim 1, further comprising:
determining, that the first image element of the image is associated with the first transaction portion, but the second image element of the image is not associated with the first transaction portion; and
based on a determination that the first transaction portion is performed, indicating, via the image, that the first image element is unavailable for additional transactions.

5. The method of claim 1, wherein the transaction is for a transfer of an item or a service between the first user and the second user.

6. The method of claim 1, further comprising:
accessing the chat session via a payment chat bot simulating one of the plurality of chat applications; and
providing the invoice to the chat session via the payment chatbot.

7. A device, comprising:
a non-transitory memory storing instructions; and
a processor configured to execute the instructions to cause the device to perform operations comprising:
accessing a chat session of a chat session type between a first user chat application instance associated with a first user and a second user chat application instance associated with a second user, the chat session hosted by a chat service provider for facilitating communication between a plurality of chat application instances that includes the first user chat application instance and the second user chat application instance, wherein one of the first user or the second user is a buyer in a transaction, and another one of the first user or the second user is a seller in the transaction;
instantiating an invoice chat bot of an entity different from the chat service provider, based on the type of the chat session, for simulating a third user chat application instance of the plurality of chat application instances, different from the first user chat application instance and the second user chat application instance, within the chat session;
based on the instantiating, registering or configuring the invoice chat bot with the chat service provider;
determining that a chat text provided in the chat session is directed to the transaction;
after the determining that the chat text provided in the chat session is directed to the transaction, making a transaction control icon accessible via a user interface of a seller side of the chat session;
detecting a selection of the transaction control icon;
determining, based on the chat text and the selection of the transaction control icon, a first payment account at a payment provider for the first user;
determining that the first user is authenticated to access the first payment account from the first chat application instance;
generating an invoice for a first transaction portion of the transaction, the invoice comprising an element for accessing the first payment account;
providing the invoice to the first chat application instance for access by the first user, including authenticated access to the first payment account via the element;
determining, in an image associated with the transaction, a first image element of the image is associated with the first transaction portion, but a second image element of the image is not associated with the first transaction portion; and
based on a determination that the first transaction portion is performed, indicating, via the image, that the first image element is unavailable for additional transactions.

8. The device of claim 7, wherein the transaction is for a transfer of an item or a service between the first user and the second user.

9. The device of claim 7, wherein the operations further comprise:
accessing the chat session via a payment chat bot simulating one of the plurality of chat application instances; and
providing the invoice to the chat session via the payment chat bot.

10. The device of claim 7, wherein the first image element of the image is associated with a first product of the transaction and wherein the second image element of the image is associated with a second product of the transaction.

11. A non-transitory machine-readable medium having instructions stored thereon, the instructions executable to cause performance of operations comprising:
accessing a chat session of a chat session type between a first user chat application instance associated with a first user and a second user chat application instance associated with a second user, the chat session hosted by a chat service provider for facilitating communication between a plurality of chat application instances that includes the first user chat application instance and the second user chat application instance;
instantiating an invoice chat bot of an entity different from the chat service provider, based on the type of the chat session, for simulating a third user chat application instance of the plurality of chat application instances, different from the first user chat application instance and the second user chat application instance, within the chat session, wherein the invoice chat bot is registered or configured with the chat service provider, such that an interactive invoicing icon associated with the entity is available via the chat session;

determining that a chat text provided in the chat session is directed to a transaction between the first user as a buyer or a seller in the transaction and the second user as the seller or the buyer in the transaction;

generating, based on an analysis of the chat text, an image depicting a product associated with the transaction;

adjusting, based on the determining, the chat session at least in part by causing the interactive invoicing icon to be displayed in a seller user interface of the chat session;

detecting an engagement of the interactive invoicing icon;

determining, based on the chat text and the engagement of the interactive invoicing icon, a first payment account at a payment provider for the first user;

determining that the first user is authenticated to access the first payment account from the first chat application instance;

generating an invoice for a first transaction portion of the transaction, the invoice comprising an element for accessing the first payment account; and providing the invoice to the first chat application instance for access by the first user, including authenticated access to the first payment account via the element.

12. The non-transitory machine-readable medium of claim 11, wherein the transaction is for a transfer of an item or a service between the first user and the second user.

13. The non-transitory machine-readable medium of claim 11, wherein the operations further comprise:
   accessing the chat session via a payment chat bot simulating one of the plurality of chat application instances; and
   providing the invoice to the chat session via the payment chat bot.

14. The non-transitory machine-readable medium of claim 11, wherein the operations further comprise determining, at least in part via analyzing the image, that a first image element of the image is associated with a first product of the transaction and that a second image element of the image is associated with a second product of the transaction.

15. The non-transitory machine-readable medium of claim 11, wherein the operations further comprise:
   determining, in the image, a first image element of the image is associated with the first transaction portion, but a second image element of the image is not associated with the first transaction portion; and
   based on a determination that the first transaction portion is performed, indicating, via the image, that the first image element is unavailable for additional transactions.

16. The method of claim 1, further comprising: causing, based on the determining that the chat text provided in the chat session is directed to the negotiation of the transaction, an information icon to be displayed via the user interface of the seller portion of the chat session, wherein the seller portion of the chat session is configured to display information about the generating of the invoice when the information icon is selected.

17. The method of claim 1, further comprising: after the negotiation of the transaction has been completed, causing the invoice to be filled with parameters of the transaction based on input received from the first user or the second user.

18. The method of claim 1, wherein the image is automatically generated at least in part via an analysis of the chat text.

19. The device of claim 7, wherein the image is automatically generated at least in part via an analysis of the chat text.

20. The non-transitory machine-readable medium of claim 11, wherein the operations further comprise automatically filling at least a part of the invoice with one or more parameters of the transaction based on an analysis of the chat text.

* * * * *